(12) United States Patent
Grunlan et al.

(10) Patent No.: US 10,347,867 B2
(45) Date of Patent: Jul. 9, 2019

(54) MULTILAYER BARRIER FILM

(71) Applicant: The Texas A&M University System, College Station, TX (US)

(72) Inventors: Jaime C. Grunlan, College Station, TX (US); Morgan A. Priolo, College Station, TX (US)

(73) Assignee: The Texas A&M University System, College Station, TX (US)

( * ) Notice: Subject to any disclaimer, the term of this patent is extended or adjusted under 35 U.S.C. 154(b) by 211 days.

(21) Appl. No.: 14/430,859

(22) PCT Filed: Sep. 24, 2013

(86) PCT No.: PCT/US2013/000220
§ 371 (c)(1),
(2) Date: Mar. 24, 2015

(87) PCT Pub. No.: WO2014/046708
PCT Pub. Date: Mar. 27, 2014

(65) Prior Publication Data
US 2015/0243928 A1    Aug. 27, 2015

Related U.S. Application Data

(60) Provisional application No. 61/705,029, filed on Sep. 24, 2012.

(51) Int. Cl.
| | |
|---|---|
| *H01L 51/52* | (2006.01) |
| *C08J 7/04* | (2006.01) |
| *B05D 7/00* | (2006.01) |
| *B05D 1/18* | (2006.01) |

(52) U.S. Cl.
CPC .......... *H01L 51/5253* (2013.01); *C08J 7/045* (2013.01); *B05D 1/185* (2013.01); *B05D 7/56* (2013.01); *C08J 2379/02* (2013.01); *Y10T 428/24975* (2015.01); *Y10T 428/25* (2015.01); *Y10T 428/251* (2015.01); *Y10T 428/256* (2015.01);
(Continued)

(58) Field of Classification Search
CPC .................................... H01L 51/5253
USPC .......................................... 428/216
See application file for complete search history.

(56) References Cited

U.S. PATENT DOCUMENTS

| | | | |
|---|---|---|---|
| 5,244,729 A | 9/1993 | Harrison | |
| 5,760,121 A * | 6/1998 | Beall .................. | A61K 8/26 524/445 |

(Continued)

FOREIGN PATENT DOCUMENTS

| | | | |
|---|---|---|---|
| CA | 2071177 A1 * | 12/1992 | |
| EP | 0 518 646 A1 | 12/1992 | |

(Continued)

OTHER PUBLICATIONS

International Search Report and Written Opinion dated Jan. 16, 2014, issued in corresponding International Application No. PCT/US2013/000220, filed Sep. 24, 2013, 14 pages.
(Continued)

*Primary Examiner* — Tahseen Khan
(74) *Attorney, Agent, or Firm* — Christensen O'Connor Johnson Kindness PLLC (57) ABSTRACT

Multilayer film prepared by a layer-by-layer process that is an effective barrier for humidity and oxygen.

17 Claims, 9 Drawing Sheets

(52) U.S. Cl.
CPC ...... *Y10T 428/259* (2015.01); *Y10T 428/2933* (2015.01)

(56) References Cited

U.S. PATENT DOCUMENTS

| | | | | |
|---|---|---|---|---|
| 5,775,601 | A | * | 7/1998 | Avant, Jr. ................ C09C 1/405 241/21 |
| 6,087,016 | A | * | 7/2000 | Feeney .................... B60C 1/00 427/245 |
| 7,776,404 | B2 | | 8/2010 | Ronk |
| 2003/0027011 | A1 | | 2/2003 | Kotov |
| 2004/0053037 | A1 | * | 3/2004 | Koch ...................... B05D 7/56 428/323 |
| 2005/0249952 | A1 | * | 11/2005 | Vasishtha ................ B01J 13/02 428/402.24 |
| 2010/0227070 | A1 | * | 9/2010 | Grunlan .................. C09D 5/18 427/352 |
| 2011/0200825 | A1 | | 8/2011 | Chakraborty et al. |

FOREIGN PATENT DOCUMENTS

| | | |
|---|---|---|
| KR | 0175682 B1 | 4/1999 |
| WO | 96/02383 A1 | 2/1996 |
| WO | 2005/058199 A1 | 6/2005 |
| WO | 2013/101975 A1 | 7/2013 |

OTHER PUBLICATIONS

Extended European Search Report dated May 31, 2016, issued in corresponding European Application No. 13838612.3, filed Sep. 24, 2013, 9 pages.

Communication Pursuant to Article 94(3) EPC dated Nov. 16, 2018, issued in corresponding European Application No. 13838612.3, filed Sep. 24, 2013, 5 pages.

* cited by examiner

MULTILAYER BARRIER FILM

FIELD OF THE INVENTION

The present invention is directed to a multilayer barrier film prepared by a layer by layer process. The multilayer film is an effective barrier for humidity and oxygen.

BACKGROUND OF THE INVENTION

Current flexible display architectures, such as those used for flexible organic light emitting diodes (FOLEDs), require a transparent barrier layer that prevents oxygen gas ingress into the device's active components. These devices require an oxygen transmission rate (OTR) below $10^{-5}$ cc/($m^2 \cdot day \cdot atm$) to achieve sufficient performance requirements (i.e., tens of thousands of hours of operation) in ambient environments. Similar layers with very low permeation rates to atmospheric gases are also key components for a variety of packaging applications, including food and pharmaceuticals. Commonly used metallized plastics have sufficiently low permeation rates for most applications, but lose their utility when product visibility is desired, as in food packaging, or even a requirement, in the case of FOLEDs. A heavily investigated alternative to the metallization of plastics is the deposition of thin metal-oxide layers via vacuum-based processes, such as physical vapor deposition or plasma-enhanced chemical vapor deposition. These inorganic barrier layers exhibit very low OTR at thicknesses as low as 100 nm. Despite exhibiting impressive barrier, low adhesion strength to plastics and inherent brittleness, because they are continuous ceramic sheets, makes these films prone to cracking and loss of barrier performance. Layering these ceramic nanocoatings with UV-curable polymer has been shown to reduce permeability, but these multilayered coatings require very complex fabrication techniques that significantly increase cost.

Clay-filled polymer composites, where individual or stacks of clay platelets are randomly dispersed in bulk polymer, offer an alternative to deposited layers on a plastic substrate. Clay nanoplatelets can be thought of as impermeable barrier particles that extend a penetrating gas molecule's travel due to their creation of a highly tortuous path. The tortuous pathway concept is the key to polymer/clay composites' gas barrier performance. In contrast to fully inorganic coatings, polymer/clay nanocomposites generally maintain desirable mechanical properties. Unfortunately, these composites typically suffer from clay aggregation and random platelet alignment, yielding poor transparency and relatively high gas permeation rates. Recent one-pot mixtures of clay in polymer have led to significant improvements in platelet alignment, but they still exhibit haziness, relatively high OTR values, and are orders of magnitude thicker than ceramic nanocoatings.

A recent review of the clay-based nanocomposites landscape stated the key to success for polymer/clay nanocomposites is the ability to incorporate uniformly dispersed, highly exfoliated, individual clay platelets in a polymer matrix. The vast literature on this topic further suggests that finding a balance between flexibility, transparency, and barrier is vital to the successful encapsulation of flexible electronic devices.

Despite the advances noted above, there exists a need to for a transparent barrier film that is effective against humidity and oxygen penetration. The present invention seeks to fulfill this need and provides further related advantages.

DESCRIPTION OF THE DRAWINGS

The foregoing aspects and many of the attendant advantages of this invention will become more readily appreciated as the same become better understood by reference to the following detailed description, when taken in conjunction with the accompanying drawings.

DETAILED DESCRIPTION OF THE INVENTION

The present invention provides multilayer films that are effective barriers for humidity and oxygen, articles of manufacture that include the films, and methods for making and using the films.

In one aspect of the invention, a coated structure is provided. The coated structure, comprises a substrate having a surface and a coating substantially covering the surface. In one embodiment, the coating comprises: (a) a first layer comprising a polycation, a polyanion, or a polar, non-ionic, water-soluble polymer; and (b) a second layer comprising a platelet having a water content of less than 7% by weight. In certain embodiments, the first layer is intermediate the substrate and second layer. In other embodiments, the second layer is intermediate the substrate and first layer.

In general, the choice of a polycation or a polyanion in first layer will depend on the selection of the platelet. If the platelet is negatively charged, then the first layer will include a polycation and the second layer will include the negatively charged platelet. Conversely, if the platelet is positively charged, then the first layer will include a polyanion and the second layer will include the positively charged platelet. Thus, a coating having layers that include the polycation and/or polyanion relies on the electrostatic interaction between them and the platelet to provide the coating (e.g., adjacent layers are oppositely charged). A coating having layers that include the polar, non-ionic, water-soluble polymer relies on hydrogen-bonding, as well as relatively weaker electrostatic interactions, between adjacent layers (e.g., layers including the platelet, a polycation, a polyanion, or another polar, non-ionic, water-soluble polymer).

In the practice of the layer-by-layer process of the invention, coatings are formed by sequential deposition of layers. The deposition of materials making up a new layer onto the deposited materials making up an existing first layer can result in the materials of the new layer penetrating the material of the existing layer to provide a region in the coating where the materials of the new and existing layers are mixed. The extent and depth of the mixing between adjacent layers will depend on the nature of the materials and the deposition process. Although the coatings of the invention described as multilayer, it will be appreciated that interaction between layers exists and that the interaction can range from an interface between the two layers to a zone between the two layers in which materials from adjacent layers are mixed.

When the platelet is applied directly to the substrate surface (i.e., the second layer is intermediate the surface and the first layer), there is an association between the surface and the platelet sufficient to provide a stable coated structure. The association can be an electrostatic association where the platelet has a net negative charge and the surface has a net positive charge, or alternatively, the platelet has a net positive charge and the surface has a net negative charge. The association can be based on polarity where the platelet has a polarity opposite that of the surface. The associate can be based on hydrogen bonding between the platelet and the substrate surface.

Figure 1:
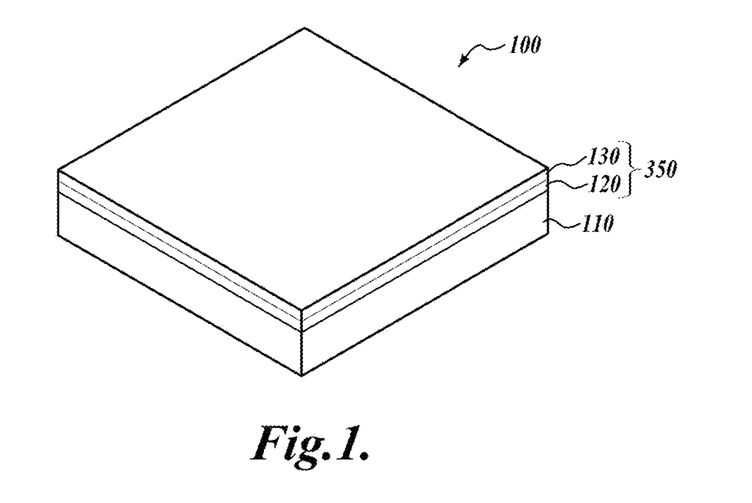
FIG. 1 is a schematic illustration of a representative coated structure of the invention in which the coating is a bilayer.

In one embodiment, the coated structure includes only a first layer and a second layer as described above and the coating is a bilayer. A schematic illustration of a representative bilayer coating of the invention is illustrated in FIG. 1. Referring to FIG. 1, representative structure 100 includes substrate 110 having first layer 120 that is coextensive with a surface of the substrate, and second layer 130 that is coextensive with a surface of the first layer. Structure 100 includes substrate 110 and bilayer 350.

The coated structures of the invention include at a minimum the first and second layers described above. It will be appreciated that a great variety of coated structures can be readily prepared by the layer-by-layer process described herein. Beyond the first and second layers described above, the number and nature of layers in a coated structure of the invention can be widely varied provided that adjacent layers have an association sufficient to provide a stable coating.

In another embodiment, the invention provides a coated substrate having four layers (e.g., a quadlayer). In this embodiment, the coating described above further includes (c) a third layer comprising a polycation, a polyanion, or a polar, non-ionic, water-soluble polymer, wherein the third layer comprises a polycation when the first layer comprises a polyanion, and wherein the third layer comprises a polyanion when the first layer comprises a polycation; and (d) a fourth layer comprising a polycation, a polyanion, or a polar, non-ionic, water-soluble polymer, wherein the fourth layer comprises a polycation when the third layer comprises a polyanion, and wherein the fourth layer comprises a polyanion when the third layer comprises a polycation. In certain embodiments, the third layer is intermediate the first and second layers. In certain embodiments, the fourth layer is intermediate the third and second layers.

Figure 2:
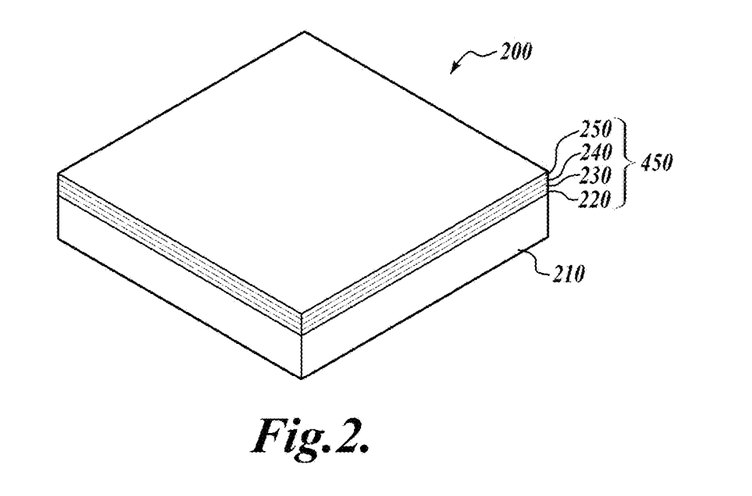
FIG. 2 is a schematic illustration of a representative coated structure of the invention in which the coating is a quadlayer.

In one embodiment, the coated structure includes only first, second, third, and fourth layer as described above and the coating is a quadlayer. A schematic illustration of a representative quadlayer coating of the invention is illustrated in FIG. 2. Referring to FIG. 2, representative structure 200 includes substrate 210 having first layer 220 that is coextensive with a surface of the substrate, second layer 230 that is coextensive with a surface of first layer 220, third layer 240 that is coextensive with a surface of second layer 230, and fourth layer 250 that is coextensive with a surface of third layer 240. Structure 200 includes substrate 210 and quadlayer 450.

In other embodiments, the present invention provides coated structures comprising the bilayers and quadlayers described herein.

In one embodiment, multi-bilayer-coated structures are provided. In this embodiment, the coated structure comprises:

(a) a substrate having a surface; and (b) a coating substantially covering the surface, the coating comprising a plurality of alternating first and second layers, wherein (i) the first layer comprises a polycation, a polyanion, or a polar, non-ionic, water-soluble polymer, and (ii) the second layer comprises a platelet having a water content of less than 7% by weight.

Figure 3:
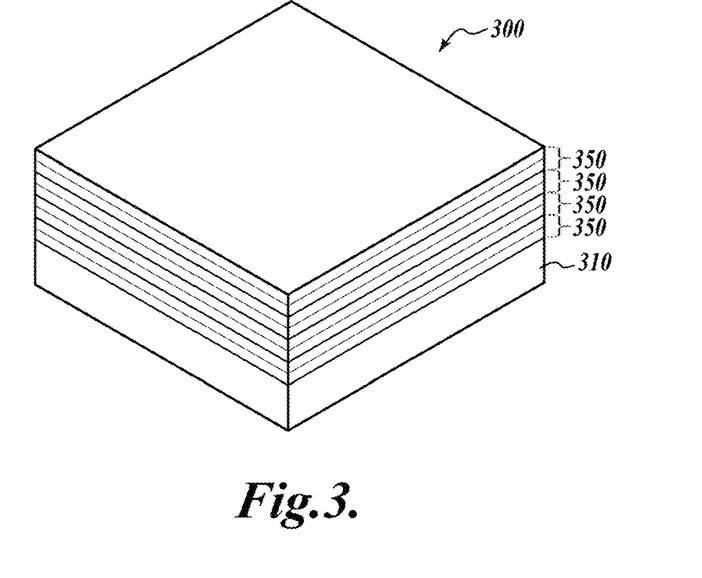
FIG. 3 is a schematic illustration of a representative coated structure of the invention in which the coating is a 4× bilayer.
Figure 4:
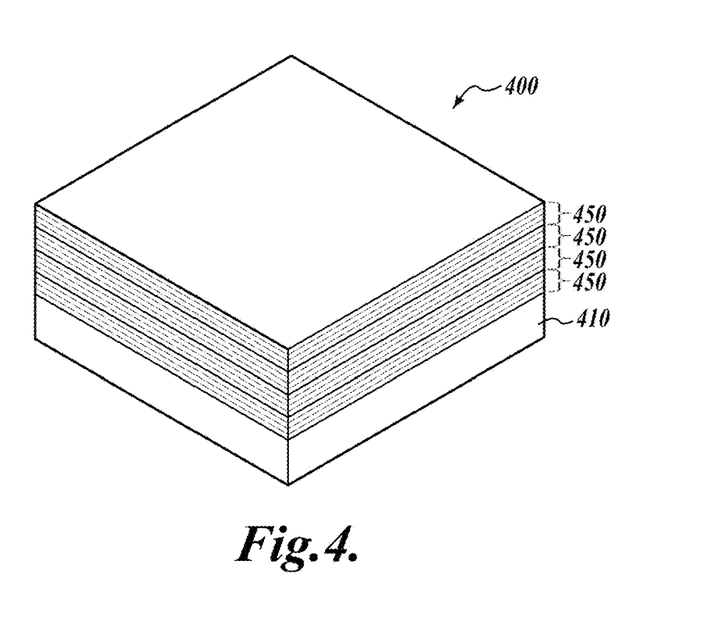
FIG. 4 is a schematic illustration of a representative coated structure of the invention in which the coating is a 4× quadlayer.

A schematic illustration of a representative multi-bilayer coating of the invention is illustrated in FIG. 3. Referring to FIG. 3, representative structure 300 includes substrate 310 having four bilayers 350.

In another embodiment, multi-quadlayer-coated structures are provided. In this embodiment, the coated structure comprises:

(a) a substrate having a surface; and (b) a coating substantially covering the surface, the coating comprising a plurality of multilayers, each multilayer comprising in sequence a first, a second, a third, and a fourth layer, wherein (i) the first layer comprises a polycation, a polyanion, or a polar, non-ionic, water-soluble polymer, and (ii) the second layer comprising a polycation, a polyanion, or a polar, non-ionic, water-soluble polymer, wherein the second layer comprises a polycation when the first layer comprises a polyanion, and wherein the second layer comprises a polyanion when the first layer comprises a polycation;

(iii) the third layer comprising a polycation, a polyanion, or a polar, non-ionic, water-soluble polymer, wherein the third layer comprises a polycation when the second layer comprises a polyanion, and wherein the third layer comprises a polyanion when the third layer comprises a polycation, and (iv) the fourth layer comprises a platelet having a water content of less than 7% by weight.

In a further embodiment, the coated structure of the invention includes a trilayer coating. In certain embodiments, the trilayer coating includes (a) first layer comprising a polycation, a polyanion, or a polar, non-ionic, water-soluble polymer, (b) a second layer comprising a polycation, a polyanion, or a polar, non-ionic, water-soluble polymer, wherein the second layer comprises a polycation when the first layer comprises a polyanion, and wherein the second layer comprises a polyanion when the first layer comprises a polycation, and (c) a third layer comprising a platelet having a water content of less than 7% by weight.

A representative trilayer coating includes a first layer comprising a polyethylenimine, a second layer comprising a polyacrylic acid, and a third layer comprising vermiculite. Another representative trilayer coating includes a first layer comprising a polyethylenimine, a second layer comprising a polyethylene oxide, and a third layer comprising vermiculite.

As described above for the bilayer and quadlayer coatings, coated structures of the invention can also include multiple trilayers. It will be appreciated that coated structures of the invention that include multiple layers need not include solely bi-, tri-, or quadlayers (e.g., a coated structure in which the coating is a plurality of bi-, tri-, or quadlayers). The coated structures of the invention that include multiple layers can include a combination of bi-, tri-, quad- or higher order layers.

As noted above, the number and nature of layers in the coating of the coated structures of the invention can be widely varied. Thus, in certain embodiments, the invention provides a coated structure, comprising:
(a) a substrate having a surface; and
(b) a coating substantially covering the surface, the coating comprising a plurality of layers, wherein each layer comprises
(i) a polycation, a polyanion, or a polar, non-ionic, water-soluble polymer, or
(ii) a platelet having a water content of less than 7% by weight, wherein each layer comprising the platelet has adjacent layers comprising a polycation, a polyanion, or a polar, non-ionic, water-soluble polymer, and wherein the coating comprises one or more layers comprising the platelet.

It will be appreciated that the platelet-containing layer can be immediately adjacent the substrate surface in any of the coated structures of the invention.

The coated structures of the invention include at least one layer that includes a platelet having a water content of less than 7% by weight. Coated structures of the invention can include platelet-containing layers in which the platelet differs from other platelet-containing layers by their water content or by the nature of the platelet itself (e.g., a coated structure with vermiculite in one or more layers and mica in one of more layers).

For the coated structures of the invention, the substrate can be any suitable substrate having a surface that benefits from the barrier that the coating provides. Suitable substrates include sheets, films, and fibers. In certain embodiments, the substrate is polymeric. Suitable polymers include polyesters, polyamides, polyimides, polyolefins, and vinyl polymers. Representative polyesters include polyethylene terephthalate, polyethylene naphthalate, polylactic acid, polybutylene succinate, polyglycolic acid, and polyhydroxyalconates. Representative polyamides include nylons. Representative polyolefins include polyethylene, polypropylene, polyethylene vinyl acetate, maleic anhydride grafted polyethylene, polyethylene acrylic acid. Representative vinyl polymers include polystyrene and polyvinyl chloride. Another representative useful polymer is polyethersulfone. Combinations of polymers are also suitable.

Suitable substrates that can be advantageously coated in accordance with the invention include substrates having more than one surface (e.g., a film having two major surfaces). The surfaces of such substrates can be selectively coated. Coated structures of the invention include structures having more than one coated surface (e.g., both major surfaces of a film).

Suitable substrates also include laminated polymeric substrates and co-extruded substrates. A laminated substrate includes two or more adhered polymeric materials (e.g., first polymer substrate|adhesive| second polymer substrate|adhesive| third polymer substrate). A co-extruded polymeric substrate is a substrate formed by co-extrusion of a multiple polymers.

In addition to synthetic polymeric substrates, suitable substrates include cellulosic substrates such as paper, fabrics, and textiles.

The substrates that are advantageously coated included substrates having formed surfaces (i.e., surfaces that on a macroscopic level are not flat).

In certain embodiments, the coated structures of the invention include a coating that includes a polycation. A used herein the term "polycation" refers to a polyelectrolyte having an overall positive charge or that can become positively charged depending on the pH of the environment (e.g., protonation of an amine group at lower pH). Representative polycations include linear polyethylenimine (LPEI), branched polyethylenimine (BPEI), poly(allyl amine), poly(vinyl amine), cationic polyacrylamide, cationic polydiallyldimethylammonium chloride (PDDA), polymelamine and copolymers thereof, polyvinylpyridine and copolymers thereof, and combinations thereof.

In certain embodiments, the coated structures of the invention include a coating that includes a polyanion. A used herein the term "polyanion" refers to a polyelectrolyte having an overall negative charge or that can become negatively charged depending on the pH of the environment (e.g., deprotonation of a carboxylic acid at higher pH). Representative polyanions include homopolymers and copolymers of acrylic acid, methacrylic acid, ethacrylic acid, maleic acid, itaconic acid, fumeric acid, styrene sulfonic acid, and vinyl phosphonic acid, and combinations thereof.

In certain embodiments, the coated structures of the invention include a coating that includes a polar, non-ionic, water-soluble polymer. A used herein the term " polar, non-ionic, water-soluble polymer" refers to a polymer that is polar (i.e., includes atoms having differing electronegativities), non-ionic (i.e., no charge), and is substantially water soluble. Representative polar, non-ionic, water-soluble polymers include polyalkylene oxide polymers (e.g., polymers and copolymers of ethylene oxide and propylene oxide), polyvinylpyrrolidone polymers, and polyvinyl alcohol polymers, and combinations thereof.

The coated structures of the invention include a platelet. Suitable platelets include naturally occurring inorganic materials (e.g., clays and minerals) and synthetic materials. Representative platelets include minerals such as vermiculite and mica; zirconium phosphate, and graphenes including graphene oxide and surface modified graphenes.

To facilitate the advantageous properties achieved by the coating of the structures of the invention, the platelet has an average aspect ratio from about 100 to about 20,000. In certain embodiments, the platelet has an average aspect ratio from about 200 to about 10,000. In some embodiments, the average aspect ratio is greater than 100; in other embodiments, greater than 500; in further embodiments, greater than 700, and in yet other embodiments, greater than 900. As used herein, the term "aspect ratio" refers to the ratio of platelet thickness to platelet diameter. Because platelet thickness is about 1 nm, the aspect ratio is the platelet diameter. "Average aspect ratio" refers to the average ratio for platelets in the layer.

As noted above, to facilitate the advantageous properties achieved by the coating of the structures of the invention, the platelet has a water content of less than 7% by weight based on the total weight of the platelet, preferably less than about 5%, and more preferably less than about 3%. In certain embodiments, the platelet has a water content from about 0.5 to about 5% by weight. In other embodiments, the platelet has a water content from about 1 to about 3% by weight. The water content of clay materials (e.g., vermiculite) is described in Grim, R. E., Applied Clay Mineralogy; McGraw-Hill: New York, N.Y., 1962; and Giiven, N., Pollastro, R. M., Society, C. M., Clay-Water Interface and its Rheological Implications; The Clay Minerals Society, 1992. Platelet water content can be measured by a moisture balance at 105° C. and after equilibrating the platelet for 72 hr at 50% relative humidity and 23° C.

For platelets that are hydrophobic and that are not capable of being suspended in a solvent useful for making coated structures of the invention, the platelet can be stabilized through the use of a surfactant. Surfactant stabilized platelets can be suspended in a useful solvent (e.g., water) thereby facilitating the formation of coatings that include hydrophobic platelets that cannot otherwise be processed in accordance with the methods of the invention.

In certain embodiments, the platelet has a surface charge greater than about 3-300 meq/100 g. See, for example, Grim, R. E., Applied Clay Mineralogy; McGraw-Hill: New York, N.Y., 1962.

The coating of the structures of the invention can include layers of varying thickness. The layers in a coating can be substantially the same (i.e., within 5 or 10% of each other) or the thickness may differ from layer to layer. Representative layer thickness ranges from about 1 to about 100 nm.

In certain embodiments, the structures of the invention have coating that are substantially transparent (e.g., greater than 90% transmission at visible wavelengths, 390 to 750 nm).

The coatings impart an advantageous average oxygen transmission rate (OTR) to the coated structures. The rates are generally dependent on the nature and number of layers. In certain embodiments, the coated structures have an average oxygen transmission rate less than about 5 $cc/(m^2day\ atm)$, preferably less than about 1.5 $cc/(m^2day\ atm)$, and more preferably less than about 1.0 $cc/(m^2day\ atm)$. Certain coated structures of the invention have undetectable average oxygen transmission rates (<0.005 $cc/(m^2day\ atm)$). In certain embodiments, the coated structures have an average oxygen transmission rate of from about 0.005 to about 5 $cc/(m^2day\ atm)$. In other embodiments, the coated structures have an average oxygen transmission rate of from about 0.005 to about 1.5 $cc/(m^2day\ atm)$. In further embodiments, the coated structures have an average oxygen transmission rate of from about 0.005 to about 1.0 $cc/(m^2day\ atm)$. For an exemplary structure having five (5) quadlayers, the average OTR was 0.18 at 50% relative humidity (RH), and for a structure having four (4) quadlayers, the average OTR was 0.60 at 50% RH. For an exemplary structure having twenty (20) bilayers, the average OTR was 0.017 at 0% RH and 0.71 at 100% RH. OTR is measured (on 179 μm thick PET) using an Oxtran 2/21 ML in accordance with ASTM D-3985 at 0% and 100% RH.

The coatings impart an advantageous average water vapor transmission rate (WVTR) to the coated structures. As noted above, the rates are generally dependent on the nature and number of layers. In certain embodiments, the coated structures have an average water vapor transmission rate less than about 3 $g/(m^2day)$ at 23° C. and 100% humidity, preferably less than about 2 $g/(m^2day)$, and more preferably less than about 1 $g/(m^2day)$. In certain embodiments, the coated structures have an average water vapor transmission rate of from about 0.05 to about 3 $g/(m^2day)$. In other embodiments, the coated structures have an average water vapor transmission rate of from about 0.1 to about 2 $g/(m^2day)$. In further embodiments, the coated structures have an average water vapor transmission rate of from about 0.1 to about 1.0 $g/(m^2day\ atm)$. For an exemplary structure having twenty (20) bilayers, the average WVTR was 0.65 at 100% relative humidity (RH). WVTR is measured by ASTM F-1249 (MOCON, 23° C. and 100% RH).

In another aspect, the invention provides articles of manufacture that include the coated structures of the invention. Representative articles include packaging material, for example for food and pharmaceuticals; display devices such as electronic devices, organic light emitting diodes, and touchscreen surfaces.

In a further aspect of the invention, methods for making coated structures are provided. The methods are referred to layer-by-layer methods because each layer of the coating is formed on a previously formed layer.

In one embodiment, the invention provides a method for making a coating on a substrate, where the coating includes two layers. In this embodiment, the method includes:

(a) contacting a substrate with a first solution comprising a polycation, a polyanion, or a polar, non-ionic, water-soluble polymer to provide a substrate having a surface coated with a polycation, a polyanion, or a polar, non-ionic, water-soluble polymer;

(b) optionally rinsing the coated surface;

(c) optionally drying the coated surface;

(d) contacting the coated surface with a second solution comprising a platelet having a water content less than 7% to provide a platelet coated surface;

(e) optionally rinsing the platelet coated surface; and (f) optionally drying the platelet coated surface.

In embodiments where the coating only includes two layers, the coating is a bilayer, as described above.

In certain embodiments, a multilayer film is prepared and the above method further includes:

(g) contacting the platelet coated surface with a first solution comprising a polycation, a polyanion, or a polar, non-ionic, water-soluble polymer to provide a substrate having a surface coated with a polycation, a polyanion, or a polar, non-ionic, water-soluble polymer;

(h) optionally rinsing the coated surface;

(i) optionally drying the coated surface;

(j) contacting the coated surface with a second solution comprising a platelet having a water content less than 7% to provide a platelet coated surface;

(k) optionally rinsing the platelet coated surface; and (l) optionally drying the platelet coated surface.

The above method is effective to provide a two (2) bilayer coating.

In a further embodiment, a multilayer film is prepared and the above method further includes repeating steps (g) through (l) n times, where n is an integer from 1 to 30. This embodiment is effective to provide an n x bilayer coating.

In another embodiment, the invention provides a method for making a coating on a substrate, where the coating includes four layers. In this embodiment, the method includes:

(a) contacting a substrate with a first solution comprising a polycation, a polyanion, or a polar, non-ionic, water-soluble polymer to provide a substrate having a surface coated with a polycation, a polyanion, or a polar, non-ionic, water-soluble polymer;

(b) optionally rinsing the coated surface;

(c) optionally drying the coated surface;

(d) contacting the coated surface with a second solution comprising a polycation, a polyanion, or a polar, non-ionic, water-soluble polymer to provide a substrate having a surface coated with a polycation, a polyanion, or a polar, non-ionic, water-soluble polymer, wherein the second solution comprises a polycation when the first solution comprises a polyanion, and wherein the second solution comprises a polyanion when the first solution comprises a polycation;

(e) optionally rinsing the coated surface;

(f) optionally drying the coated surface;

(g) contacting the coated surface with a third solution comprising a polycation, a polyanion, or a polar, non-ionic, water-soluble polymer to provide a substrate having a surface coated with polycations or polyanions, wherein the third solution comprises a polycation when the second solution comprises a polyanion, and wherein the third solution comprises a polyanion when the second solution comprises a polycation;

(h) optionally rinsing the coated surface;

(i) optionally drying the coated surface;

(j) contacting the coated surface with a fourth solution comprising a platelet having a water content of less than 7% to provide a platelet coated surface;

(k) optionally rinsing the platelet coated surface; and (l) optionally drying the platelet coated surface.

In embodiments where the coating only includes four layers, the coating is a quadlayer, as described above.

In certain embodiments, a multilayer film is prepared and the above method further includes:

(m) contacting the platelet coated surface with a first solution comprising a polycation, a polyanion, or a polar, non-ionic, water-soluble polymer to provide a substrate having a surface coated with a polycation, a polyanion, or a polar, non-ionic, water-soluble polymer;

(n) optionally rinsing the coated surface;

(o) optionally drying the coated surface;

(p) contacting the coated surface with a second solution comprising a polycation, a polyanion, or a polar, non-ionic, water-soluble polymer to provide a substrate having a surface coated with a polycation, a polyanion, or a polar, non-ionic, water-soluble polymer, wherein the second solution comprises a polycation when the first solution comprises a polyanion, and wherein the second solution comprises a polyanion when the first solution comprises a polycation;

(q) optionally rinsing the coated surface;

(r) optionally drying the coated surface;

(s) contacting the coated surface with a third solution comprising a polycation, a polyanion, or a polar, non-ionic, water-soluble polymer to provide a substrate having a surface coated with a polycation, a polyanion, or a polar, non-ionic, water-soluble polymer, wherein the third solution comprises a polycation when the second solution comprises a polyanion, and wherein the third solution comprises a polyanion when the second solution comprises a polycation;

(t) optionally rinsing the coated surface;

(u) optionally drying the coated surface;

(v) contacting the coated surface with a fourth solution comprising a platelet having a water content of less than 7% to provide a platelet coated surface;

(w) optionally rinsing the platelet coated surface; and (x) optionally drying the platelet coated surface.

The above method is effective to provide a two (2) quadlayer coating.

In a further embodiment, a multilayer film is prepared and the above method further includes repeating steps (m) through (x) n times, where n is an integer from 1 to 30. This embodiment is effective to provide an n x quadlayer coating.

In the above methods, contacting can include dip coating, spray coating, roll coating, or printing.

In the above methods, the solvent for the polycation, polyanion, or polar, non-ionic, water-soluble polymer can be deionized water; the solvent for the platelet can be deionized water, and rinsing can include rinsing with deionized water.

In the above methods, the product coated structure is dried, typically by subjecting the coated structure to elevated temperature (e.g., 70° C.) for a period of time (e.g., 15 min.)

The coated structures of the invention can be subjected to additional treatments that further enhance the advantageous properties of these structures. Representative treatments include chemical crosslinking. Intermediate layers formed during the preparation process can be subject to additional treatment (e.g., crosslinking) to enhance the properties of the product coated structure.

The following is a description of representative multilayer barrier films, their preparation, and their properties.

Layer-by-layer (LbL) assembly is a relatively inexpensive water-based coating technique that utilizes the natural complexation of oppositely charged (or otherwise functionalized) species onto a surface. The sequential exposure of a substrate to alternating cationic and anionic mixtures yields nanometer-scale buildup of multilayered, multifunctional thin films, where these mixtures often contain nanoparticles. LbL deposition produces composites of highly aligned and exfoliated clay layers in a polymer matrix that remain transparent, flexible and exhibit super gas barrier properties (OTR<0.005 cc/(m$^2$·day·atm).

The impressive gas barrier that is reported is believed to be due to a highly aligned, nanobrick wall structure that creates extreme tortuosity for gas molecule diffusion. This type of tortuous pathway was previously modeled resulting in a mathematical representation of relative permeability:

$$\frac{P_o}{P} = 1 + \mu\alpha^2\left(\frac{\phi^2}{1-\phi}\right), \quad (1)$$

where $P_o$ is the polymer matrix permeability, P is the composite permeability, $\mu$ is a filler geometric factor, $\alpha$ is the filler aspect ratio, defined as (l/2)/d, and $\phi$ is the volume fraction of filler. This model predicts that larger aspect ratio fillers will improve the barrier of polymer nanocomposites, with relative permeability ($P_o$/P) scaling with the square of $\alpha$ (Eq. 1).

The present invention provides a method for LbL assembly of cationic, branched polyethylenimine (PEI) and anionic, large aspect ratio vermiculite clay (VMT), which results in films that exhibit unprecedented optical clarity and super gas barrier when deposited on PET film.

Figure 5A:
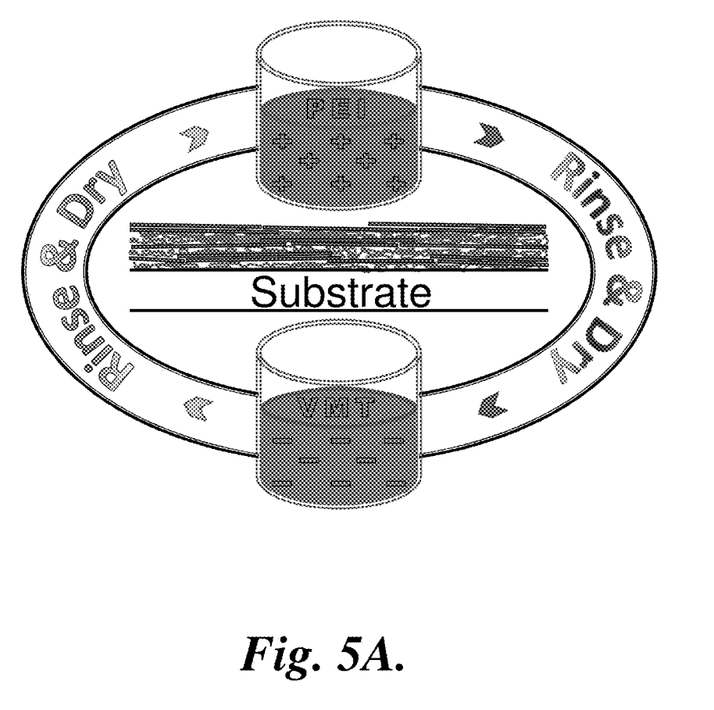
FIG. 5A is a schematic of a representative LbL assembly with cationic polyethylenimine (PEI) and anionic vermiculite (VMT) clay and a cross-sectional illustration of the resultant thin film.
Figure 5B:
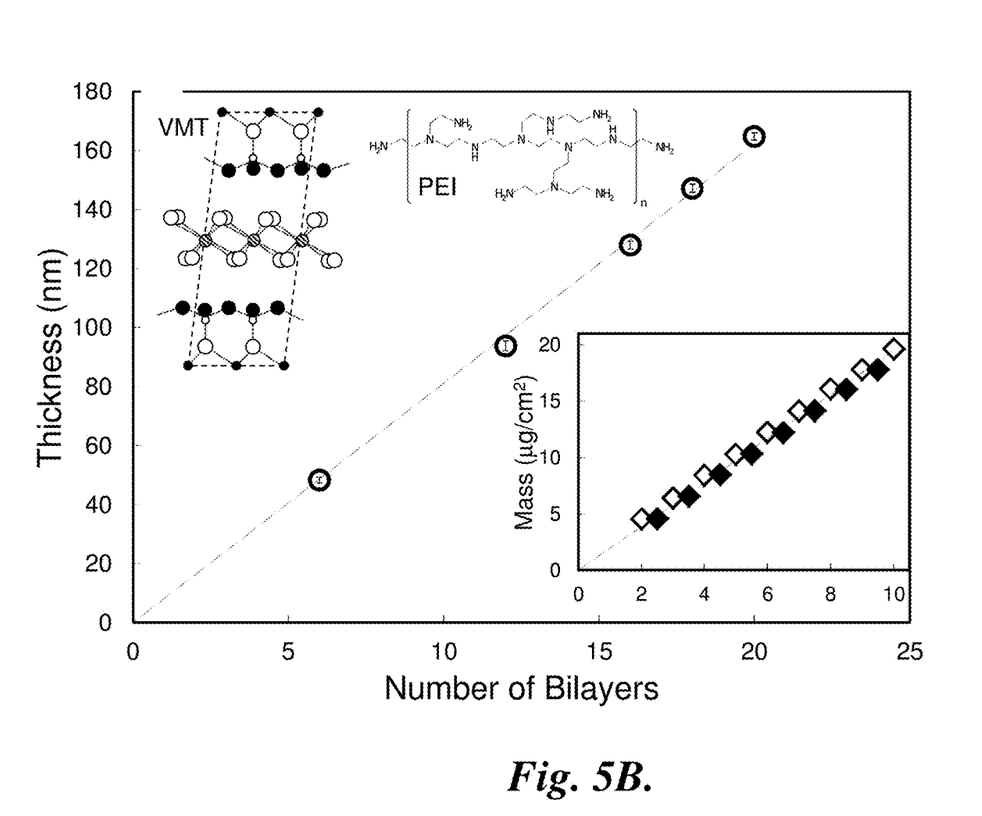
FIG. 5B illustrates thickness as a function of PEI/VMT bilayers deposited. The inset shows mass deposition as a function of bilayers deposited, with half bilayers representing PEI deposition. VMT structure legend: ●Mg, Fe, Al; ○$O_1$; ○Si, Al; ●$O_{2,3}$; ●Mg.

Bilayers were deposited, from 0.1 wt % solutions of pH 10 PEI and 2 wt % suspensions of VMT (illustrated in FIG. 5A), onto a silicon wafer to monitor film growth as a function of layers deposited, as shown in FIG. 5B. Film growth is shown to increase linearly as a function of bilayers deposited, with a growth rate of approximately 8 nm per bilayer, suggesting that all vermiculite deposition is oriented parallel to the substrate. Any significant misorientation of platelets would result in film thickness values on the order of hundreds of nanometers after only a few layers due to the large size of individual VMT platelets (average effective diameter about 1.1 µm). Mass deposited per layer exhibits a similar linear growth trend as shown for film thickness, as shown in FIG. 5C, and reveals incredibly high clay concentration at 96.6 wt %. These data support the idea of multi-platelet deposition per layer and represent the highest clay concentration ever reported for a dense polymer nanocomposite ($\rho$ about 2.4 g/cm$^3$). With a thickness per bilayer around 8 nm, these stacks of platelets could total no more than four or five in each layer, which is excellent exfoliation for platelets with $\alpha$>1000.

Figure 6A:
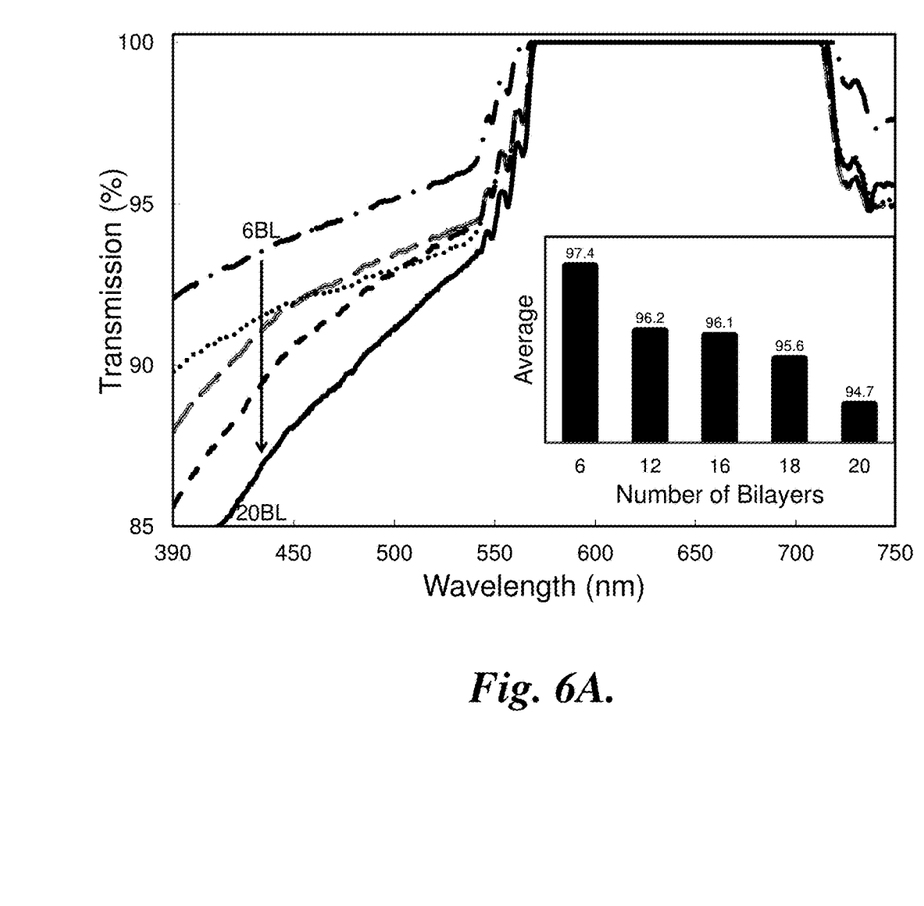
FIG. 6A illustrates visible light transmission as a function of wavelength for PEI/VMT films deposited onto quartz glass. Inset shows average visible light transmission as a function of bilayers deposited.
Figure 6B:
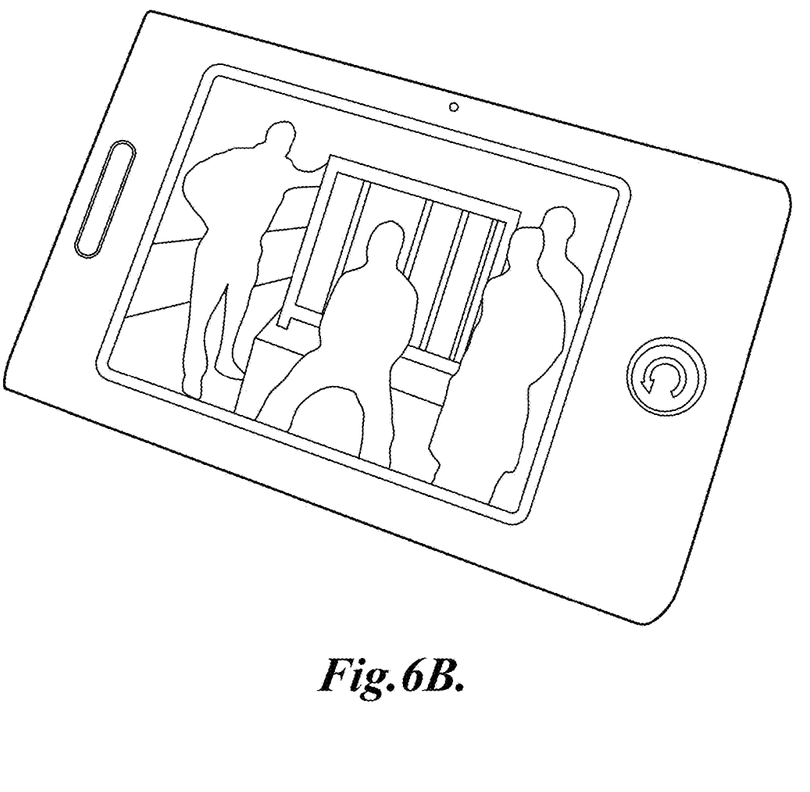
FIG. 6B is an image of a half-coated media player screen is shown to highlight transparency of representative coatings of the invention.

UV-vis spectroscopy (FIG. 6A) reveals that, even at such high clay concentration, these films exhibit excellent transparency throughout the visible light spectrum (390-750 nm). 20 BL films achieve visible light transparency greater than 94.7%, providing further evidence that clay deposition occurs in a highly oriented and exfoliated manor. Even a modest lack of clay orientation, or significant platelet stacking, with each layer deposited would have compounding effects on light transmission, exponentially decreasing transparency as a function of layers deposited, which is not exhibited here. FIG. 6B shows a 20-bilayer coating deposited directly onto the surface of a touchscreen media player to highlight the transparency and utility of these films as an encapsulation layer for electronic displays. The coating was applied using a LbL dipping process and the nearly imperceptible line running across the center of the screen is the top of the coating. The uncoated portion of the screen shows minimal differences in display emission when compared to the coated portion, with little discernible difference when viewed at varying angles. This transparency is achieved only when clay platelets deposit in the film in a highly exfoliated state, where the thickness of individual platelets is too small to interact with visible light transmission. Also, the deposition of this nanocoating directly onto the touchscreen's surface did no harm to the touch functionality.

Figure 7A:
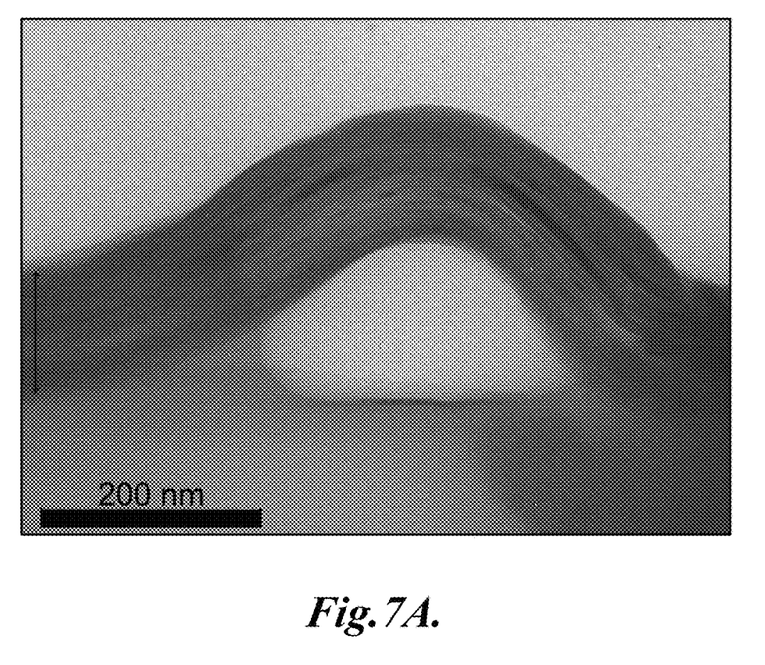
FIG. 7A is a TEM image of 12 PEI/VMT bilayers deposited onto PET film. The arrow spans the LbL film thickness.

The exfoliation state of VMT in these films is clearly observed in the cross-sectional TEM image of a 12-bilayer film deposited onto PET, shown in FIG. 7A. Individually deposited vermiculite clay platelets can be seen in this image as dark, wavy horizontal lines, revealing the typical nanobrick wall structure exhibited by polymer/clay LbL films. The highly aligned structure seen in this micrograph also confirms that every platelet deposited in the film lays flat, with its largest dimension parallel to the substrate. These incredibly high levels of clay loading and exfoliation are only achievable by the self-assembling, self-terminating nature of the LbL assembly process.

Figure 7B:
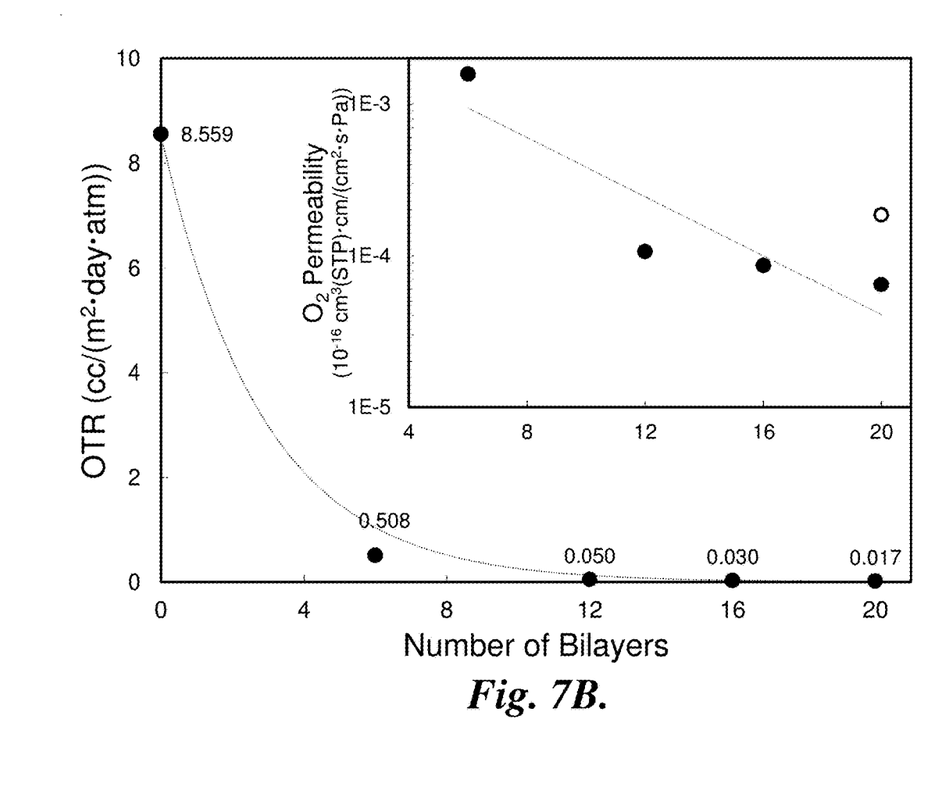
FIG. 7B compares oxygen transmission rate and oxygen permeability as function of PEI/VMT bilayers (filled points) and a 20 BL PEI/MMT (montmorillonite) film (unfilled point) deposited onto PET.

FIG. 7B reveals that the OTR of these assemblies decreases exponentially as a function of bilayers deposited onto PET film. (A 6-bilayer film, only 48 nm thick, lowers the OTR by more than an order of magnitude, from 8.6 cc/(m$^2$·day·atm) for bare PET to 0.5 cc/(m$^2$·day·atm) at 0% RH, making it useful for food packaging and LED/LCD panel or photovoltaic device encapsulation. After 20 bilayers are deposited onto PET, this system exhibits super gas barrier properties, with an OTR of 0.017 cc/(m$^2$·day·atm) at 0% RH. The inset in FIG. 7B reveals that the oxygen permeability of these films also decreases exponentially as a function of bilayers deposited, a phenomenon unique to these LbL thin films. While film thickness is increased by a factor of 3.4, from 6 to 20 bilayers, thin film permeability decreases by a factor of 25. More impressive is the OTR disparity of these same films, where OTR decreases by more than an order of magnitude from 6 to 20 bilayers.

The super oxygen barrier of these thin film assemblies (summarized in Table 1) is believed to be due to the existence of a nanobrick wall structure, revealed in FIG. 7A, that creates a tortuous pathway for permeating gas molecules. While diffusing through the thin film assembly, gas molecules must travel around individually deposited (or stacks of just a few) VMT platelets, which significantly extends the diffusion length traveled. This larger residence time of a permeating molecule in the film's thickness yields a lower rate of gas permeation. When compared to a previously reported thin film of PEI/MMT, the films of the invention utilize vermiculite clay that has an aspect ratio that is an order of magnitude larger than MMT and is shown to deposit more clay in the thin film (92 vol % VMT as compared to 83 vol % MMT), as shown in Table 1. This combination of larger aspect ratio and higher clay concentration results in a 20-bilayer VMT-based film to exhibit an OTR that is a factor of 3 lower than the same film made with MMT. In addition, as seen in Table 1, this simple alteration of clay platelet choice is capable of improving the barrier improvement factor (BIF, uncoated PET permeability divided by the coated permeability) by a factor of 5, where 20 bilayers of PEI/VMT yield a BIF of 500, as compared to 110 for films made with MMT deposited on 179 µm PET.

TABLE 1

Volume Fraction of Clay, OTRs, and BIF of Films Deposited on 179 µm PET

| Thin Film Assembly | Volume Fraction Clay ($\phi$) | OTR (cm$^3$/m$^2$ · day · atm) | Oxygen Permeability ($10^{-16}$ cm$^3$(STP) · cm/ (cm$^2$ · s · Pa)) Coating$^a$ | Total | BIF ($P_S/P_T$) |
|---|---|---|---|---|---|
| 179 µm PET | — | 8.559 | — | 17.50 | — |
| (PEI/VMT)$_{20}$ | 0.92 | 0.017 | 0.000064 | 0.035 | 500 |
| (PEI/MMT)$_{20}$ | 0.83 | 0.078 | 0.00019 | 0.16 | 110 |

$^a$Coating permeability was decoupled from the total using the method described in Roberts, A. P.; Henry, B. M.; Sutton, A. P.; Grovenor, C. R. M; Briggs, G. A. D.; Miyamoto, T.; Kano, A.; Tsukahara, Y.; Yanaka, M. *J Membrane Sci* 2002, 208, 75-88.

Figure 8:
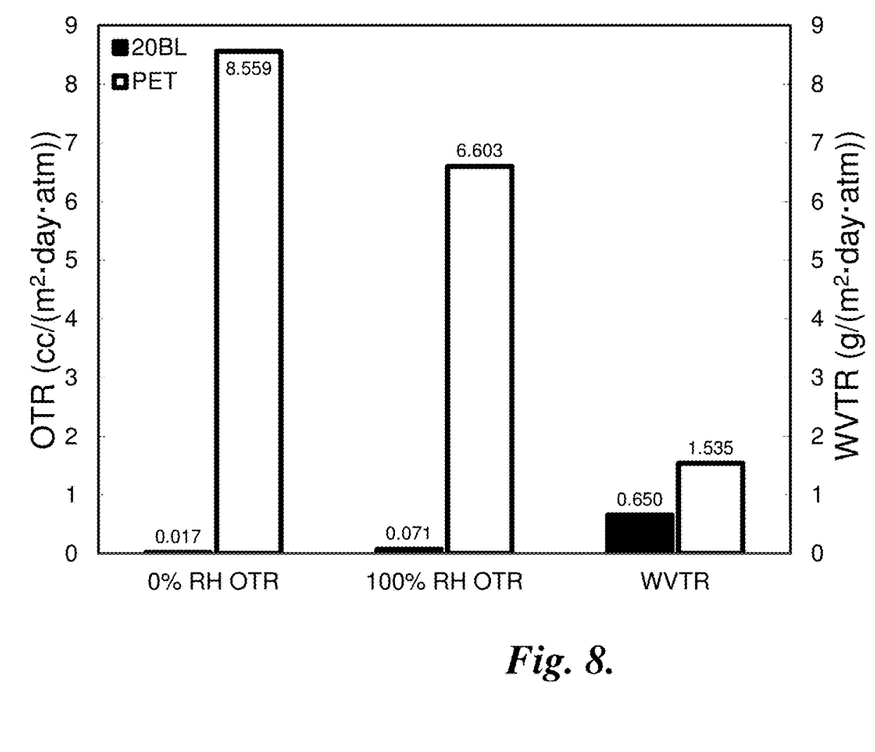
FIG. 8 compares oxygen (OTR) and water vapor (WVTR) transmission rates of 179 μm PET film and 20BL VMT-based assemblies on 179 μm PET film.

The OTR values in Table 1 were measured under dry conditions (0% RH), but it is well known that LbL film properties degrade under elevated humidity. Oxygen barrier performance under humid conditions was evaluated by testing the OTR of a 20-bilayer film deposited onto PET at 100% RH. FIG. 8 shows that the oxygen transmission rates of the 20BL film increases as a function of relative humidity, however this increase is much less than that reported previously for MMT-based thin films. The 20BL coating exhibits a decrease in barrier by a factor of 4 when exposed to 100% RH. This is in stark contrast to the polymer/clay coatings previously reported, which suffered orders of magnitude increases in OTR when exposed to similar humidity levels. The improvement at higher RH is believed to be due to the lower moisture absorption of the clay.

LbL gas barrier films have also been mostly tested for their low permeability to oxygen gas, with water vapor transmission rates (WVTR) generally left untested. This 20BL coating was deposited on PET, which has a WVTR of approximately 1.5 g/(m$^2$·day) at 100% RH, and exhibited a WVTR improvement of 57% (FIG. 8). This large improvement in water vapor barrier is impressive for films created from dilute, aqueous mixtures and is believed to be due to the tightly-packed, highly-aligned nanobrick wall structure (FIG. 7A) comprised of 96.6 wt % VMT and the low moisture absorption characteristics of VMT. These factors lead to films that are less sensitive to humidity and impart more than a factor of two water vapor barrier improvement on 179 μm PET, at a thickness of less than 165 nm.

In conclusion, vermiculite clay was deposited successfully, for the first time in an LbL film, alongside polyethylenimine. Film growth measured on a silicon wafer demonstrates a linear growth rate of approximately 8 nm per bilayer, while deposition onto quartz glass sides reveals that a 20-bilayer film remains 95% transparent with 96.6 wt % clay. When deposited onto 179 μm PET film, this 20-bilayer nanocoating exhibits an OTR an order of magnitude less than that for a similar coating produced with MMT clay, yielding a barrier improvement factor of 500. These films also exhibit a less humidity-sensitive oxygen barrier and improve the WVTR of PET by over 50%. At only 164 nm thick, this completely transparent and highly flexible film is among the best polymer/clay nanocomposites ever reported for gas barrier, and represents an inexpensive, relatively simple alternative to inorganic layers for a variety of packaging applications.

The present invention provides thin films that are transparent, a barrier to gases, and moisture resistant. In one embodiment, large aspect ratio vermiculite (VMT) clay into the thin films, which are fabricated using the layer-by-layer assembly technique. Thin films of branched polyethylenimine (PEI) and VMT were analyzed for their growth rate, clay composition, transparency, and gas barrier behavior. In certain embodiments, the films include more than 96 wt % clay, are greater than 95% transparent, and, due to their nanobrick wall structure, exhibit super gas barrier behavior at thicknesses less that 165 nm. When coupled with their flexibility, optical clarity, and super barrier properties, these films are effectively used as coatings for a variety of packaging applications.

The following example is provided for the purpose of illustrating, not limiting, the invention.

EXAMPLE

Example 1

In this example, the preparation and characteristics of a representative coated structure of the invention is described.

Thin Film Materials. Specialty Vermiculite Corp. (Cambridge, Mass.) supplied the natural vermiculite (VMT) (Microlite 963++) clay dispersion. Branched polyethylenimine (PEI) ($M_w$=25,000 g/mol, $M_n$=10,000 g/mol) was purchased from Sigma-Aldrich (Milwaukee, Wis.). Aqueous, 0.1 wt % PEI solutions were prepared using 18.2 MΩ deionized water and rolling for 24 hours. Prior to deposition, each PEI solution's pH was altered to 10 using 1M HCl. Aqueous suspensions of VMT (2 wt % in deionized water) were prepared 48 hours before use by rolling for 24 hours and allowing for sedimentation of insoluble fractions for the remaining 24 hours. The unaltered supernatant was used and measured to be pH 7.5, 2 wt % VMT, and have an average effective diameter of 1.1 μm.

Substrates. Single-side-polished, silicon wafers, purchased from University Wafer (South Boston, Mass.), were used as substrates to monitor film growth via ellipsometry. One millimeter thick, fused quartz slides, purchased from Structure Probe, Inc. (West Chester, Pa.), were used as substrates to monitor light transmission via UV-vis spectrometry. Silicon wafers, cut to approximately 4 in.×1 in. strips, and 3 in.×1 in. quartz slides, were cleaned with piranha solution for 30 minutes, rinsed with deionized water, acetone, and water again, and dried with filtered air prior to deposition. Polished Ti/Au crystals with a resonance frequency of 5 MHz, purchased from Maxtek, Inc. (Cypress, Calif.), were used as substrates to monitor mass deposition via quartz crystal microbalance (QCM). QCM crystals were plasma cleaned in a PDC-32G plasma cleaner from Harrick Plasma (Ithaca, N.Y.) for 5 min at 10.5 W prior to deposition. 179 μm thick Melinex® ST505 poly(ethylene terphthalate) film (PET), produced by Dupont-Teijin Films, and purchased from Tekra (New Berlin, Wis.), was used as the substrate for OTR testing and TEM images. PET was rinsed with deionized water, methanol, water again, dried with filtered air and finally corona treated using a BD-20C Corona Treater (Electro-Technic Products, Inc., Chicago, Ill.) prior to deposition.

Thin Film Deposition. Treated substrates were dipped in the PEI solution for 5 min, rinsed in a stream of deionized water, and dried in a stream of filtered air. This procedure was followed by an identical dipping, rinsing and drying procedure in the VMT suspension. After this initial bilayer was deposited, the same procedure was followed with 5 s PEI and 1 min VMT dip times for each subsequent layer until the desired number of layers were deposited. All thin films were prepared using a robotic dipping system described in Jang, W. S.; Grunlan, J. C. *Rev Sci Instrum* 2005, 76; and Gamboa, D.; Priolo, M. A.; Ham, A.; Grunlan, J. C. *Rev Sci Instrum* 2010, 81. Films created for OTR testing were placed in an oven at 70° C. for 15 min immediately following deposition.

Characterization Techniques. Film thickness was measured (on silicon wafers) using an alpha-SE Ellipsometer (J.A. Woollam Co., Inc., Lincoln, Neb.). Mass deposition was measured (on Ti/Au crystals) using a Research Quartz Crystal Microbalance (Maxtek, Inc., Cypress, Calif). Film absorbance was measured (on quartz glass slides) using a USB2000 UV-vis spectrometer (Ocean Optics, Dunedin, Fla.). A thin film cross section was imaged using a JEOL 1200 EX (Peabody, Mass.) TEM at an accelerating voltage of 100 kV and calibrated magnifications. A 12 BL thin film was deposited on PET, coated with carbon, and embedded in epoxy prior to sectioning. Thin sections (about 100 nm thick) were floated onto water and picked up using carbon-stabilized, Formvar-coated 150 mesh nickel grids (Electron Microscopy Sciences, Hatfield, Pa.) in preparation for imaging. OTR and WVTR was measured (on 179 μm thick PET), and performed by MOCON (Minneapolis, Minn.), using an Oxtran 2/21 ML Oxygen Permeability Instrument (in accordance with ASTM D-3985) at 23° C. and at 0% and 100% RH and a Permatran-W 3/33 Water Vapor Permeability Instrument (in accordance with ASTM F-1249) at 23° C. and 100% RH. VMT particle size was determined using a ZetaPALS (Zeta Potential Analyzer Utilizing Phase Analysis Light Scattering) system from Brookhaven Instruments Corporation (Holtsville, N.Y.).

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A coated structure, comprising:
   (a) a substrate having a surface; and
   (b) a coating substantially covering the surface, the coating comprising a plurality of bilayers, each bilayer consisting of alternating first and second layers, wherein
      (i) the first layer comprises a polycation, a polyanion, or a polar, non-ionic, water-soluble polymer, and
      (ii) the second layer comprises a vermiculite platelet having an average aspect ratio greater than 1,000,
   wherein the coating comprises greater than 90 wt % vermiculite.

2. The structure of claim 1, wherein the first layer is intermediate the substrate and second layer.

3. The structure of claim 1, wherein the second layer is intermediate the substrate and first layer.

4. The structure of claim 1, wherein the substrate is a sheet, film, or fiber.

5. The structure of claim 1, wherein the substrate is polymeric.

6. The structure of claim 1, wherein the polycation is selected from the group consisting of linear polyethylenimine (LPEI), branched polyethylenimine (BPEI), poly(allyl amine), poly(vinyl amine), cationic polyacrylamide, cationic polydiallyldimethylammonium chloride (PDDA), polymelamine and copolymers thereof, polyvinylpyridine and copolymers thereof, and combinations thereof.

7. The structure of claim 1, wherein the polyanion is selected from the group consisting of homopolymers and copolymers of acrylic acid, methacrylic acid, ethacrylic acid, maleic acid, itaconic acid, fumeric acid, styrene sulfonic acid, vinyl phosphonic acid, and combinations thereof.

8. The structure of claim 1, wherein the polar, non-ionic, water-soluble polymer is selected from the group consisting of a polyalkylene oxide polymer (polymers and copolymers of ethylene oxide and propylene oxide), a polyvinylpyrrolidone polymer, a polyvinyl alcohol polymer, and combinations thereof.

9. The structure of claim 1, wherein the platelet has an average aspect ratio from about greater than 1,000 to about 20,000.

10. The structure of claim 1, wherein the platelet has a water content from about 0.5 to about 5% by weight.

11. The structure of claim 1, wherein each layer bilayer has a thickness from about 1 to about 100 nm.

12. The structure of claim 1, wherein the coating is substantially transparent.

13. The structure of claim 1 having an average oxygen transmission rate of from about 0.005 to about 5 cc/(m2day atm).

14. The structure of claim 1 having an average water vapor transmission rate of from about 0.05 to about 3 g/(m2day atm) at 100% humidity.

15. An article of manufacture, comprising the structure of claim 1.

16. A method for making a multilayer film, comprising:
   (a) contacting a substrate with a first solution comprising a polycation, a polyanion, or a polar, non-ionic, water-soluble polymer to provide a substrate having a surface coated with a polycation, a polyanion, or a polar, non-ionic, water-soluble polymer;
   (b) optionally rinsing the coated surface;
   (c) optionally drying the coated surface;
   (d) contacting the coated surface with a second solution comprising a vermiculite platelet having an average aspect ratio greater than 1,000 to provide a platelet coated surface;
   (e) optionally rinsing the platelet coated surface; and
   (f) optionally drying the platelet coated surface,
   wherein the film comprises greater than 90 wt % vermiculite.

17. The article of claim 15, wherein the article is a packaging material or a display device.

* * * * *